United States Patent [19]

Petrell, Jr.

[11] Patent Number: 5,050,898
[45] Date of Patent: Sep. 24, 1991

[54] MOBILE PLATFORM FOR A SNOW PLOW

[76] Inventor: A. Raymond Petrell, Jr., 116 Adams, North Abington, Mass. 02351

[21] Appl. No.: 508,797

[22] Filed: Apr. 12, 1990

[51] Int. Cl.$^5$ .............................................. B62B 3/10
[52] U.S. Cl. ................................ 280/79.11; 280/79.3
[58] Field of Search .................... 280/79.11, 79.3, 62, 280/2, 481, 188, 477

[56] References Cited

U.S. PATENT DOCUMENTS

| 3,941,400 | 3/1976 | Büttner | 280/79.11 |
| 4,248,445 | 2/1981 | Vassar | 280/79.11 |
| 4,572,531 | 2/1986 | Elia | 280/79.11 |
| 4,650,392 | 3/1987 | Casteel | 269/17 X |

Primary Examiner—David M. Mitchell
Assistant Examiner—Martin Gerich
Attorney, Agent, or Firm—Jerry Cohen; Harvey Kaye

[57] ABSTRACT

A mobile platform for attaching and detaching a snow plow to vehicles and providing mobile storage and displaying of such plows. This device also provides an off the ground service platform for plows. The mobile platform has a frame shaped to hold the bottom of a curved snow plow blade and having a portion disposed at an angle which is relative to the incline at the bottom of snow plows in order to support the plow on the platform, wheels mounted on the frame so that the mobil platform can be moved and including a swivel wheel at the front of the frame, and an adjustable support on the frame and positioned to support the push frame of a snow plow, and the height of which is adjustable.

13 Claims, 6 Drawing Sheets

MOBILE PLATFORM FOR A SNOW PLOW

BACKGROUND OF THE INVENTION

The present invention relates generally to the snow plow field, and, more particularly, to a mobile platform for holding a snow plow while it is being attached or detached from a vehicle and also for storing and displaying snow plows.

In the past, snow plows have usually been connected with a vehicle manually, and this has usually required more than one person to accomplish. Moreover, snow plows are heavy and are impossible or difficult for a crew to lift and move manually, as has been required at times in the past.

Snow plows are usually connected to vehicles which are used for other purposes when the plow is not attached, and therefore virtually all vehicles which are used to push a snow plow are detachable and are usually not attached to the vehicle. When it snows it is then required to attach the plows to the vehicles and this requires at least two people.

While there have been devices for use in attaching and detaching snow plows from a vehicle, they have generally been unwieldy, heavy, complicated and expensive.

BRIEF SUMMARY OF THE INVENTION

Accordingly, it is an object of the present invention to provide a mobile platform for holding a snow plow while it is being attached or detached from a vehicle which is free of the defects of the prior devices known in the art heretofore.

It is another object of the present invention to provide a snow plow mobile platform which is easy to use by just one person, which is simple, relatively light in weight and inexpensive to make.

Further objects of the present invention are to provide easy, quick and safer attaching and detaching of plows by a single person; to permit lateral and vertical alignments to be accomplished together with no assumptions as to where parts are located, that is, no blind lining up of the truck and the plow; and provides a way of moving the plow to the truck rather than the truck to the plow, which in the past has proven to be cumbering and time consuming.

Other objects, features and advantages will be apparent from the following detailed description of preferred embodiments taken in conjunction with the accompanying drawings in which:

DETAILED DESCRIPTION OF THE DRAWINGS

Figure 1:
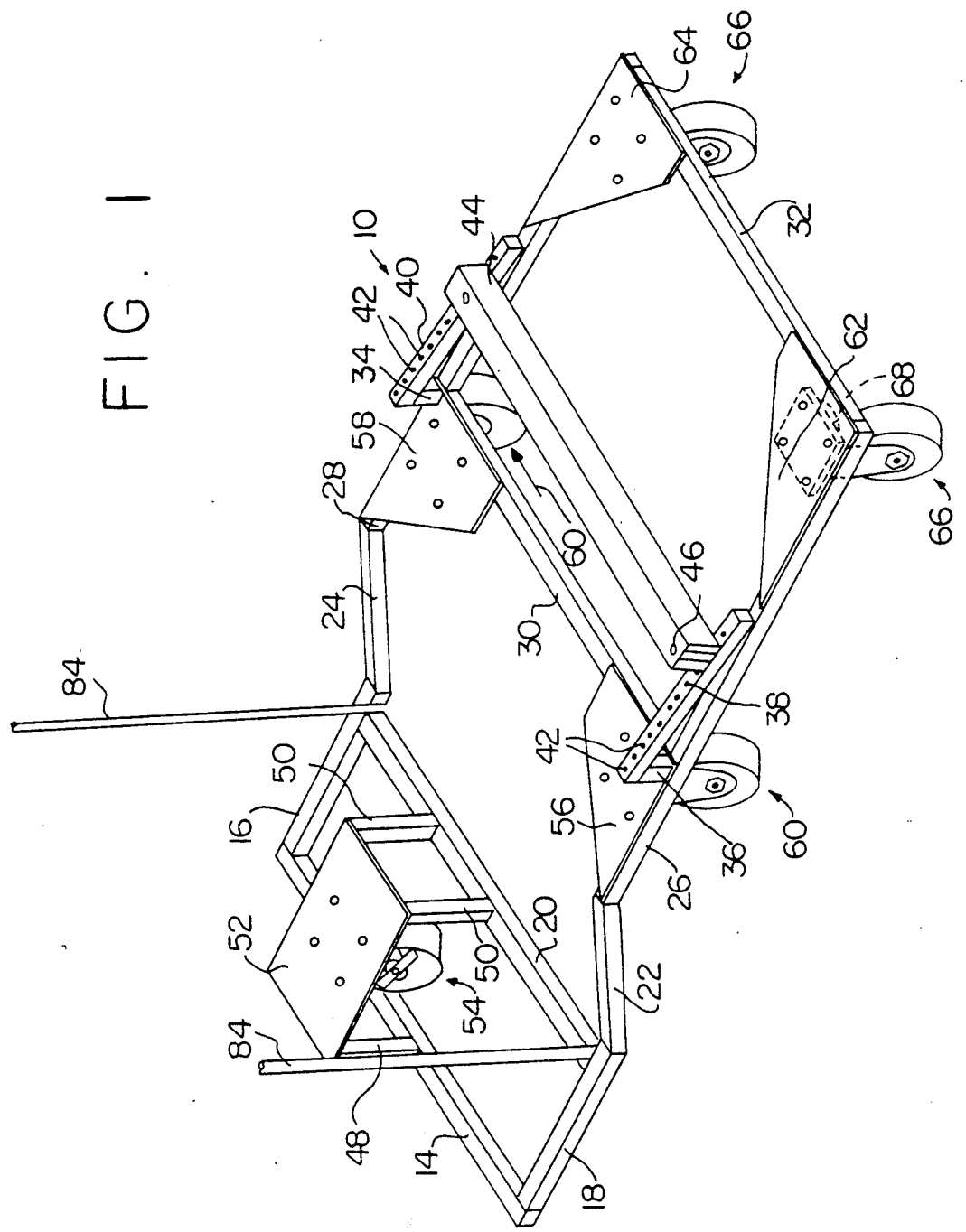
FIG. 1 is a perspective view of the snow plow mobile platform which constitutes the present invention.
Figure 2:
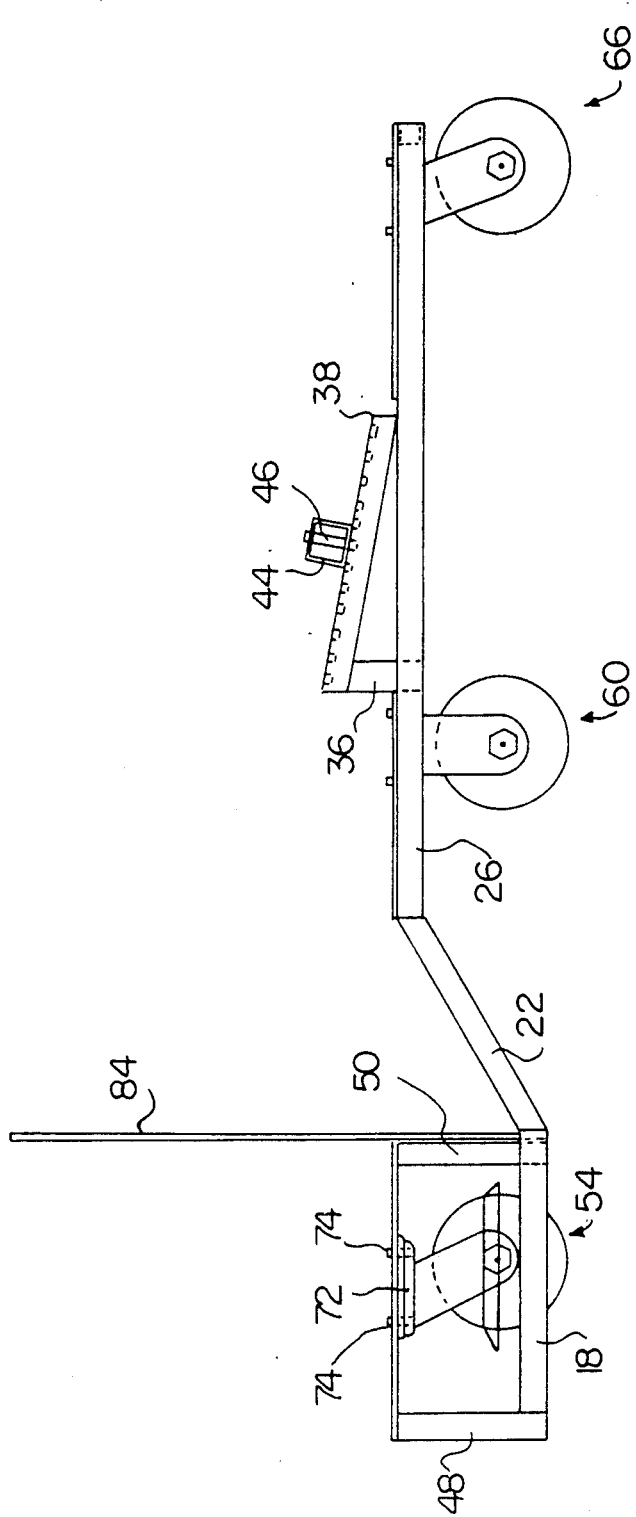
FIG. 2 is a side elevational view of the mobile platform shown in FIG. 1.
Figure 3:
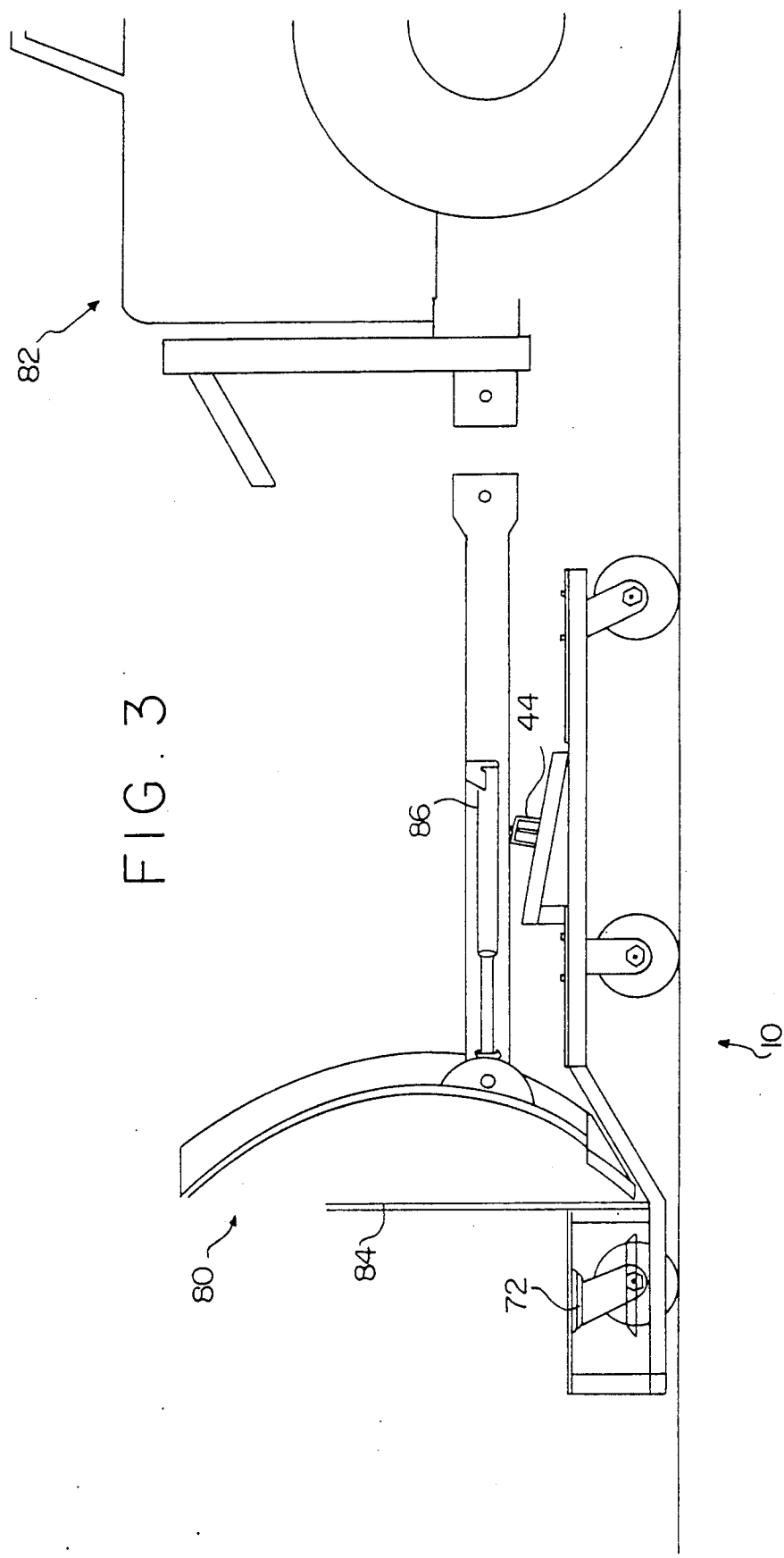
FIG. 3 is a side elevational view similar to FIG. 2, but also showing the snow plow on the mobile platform.
Figure 4:
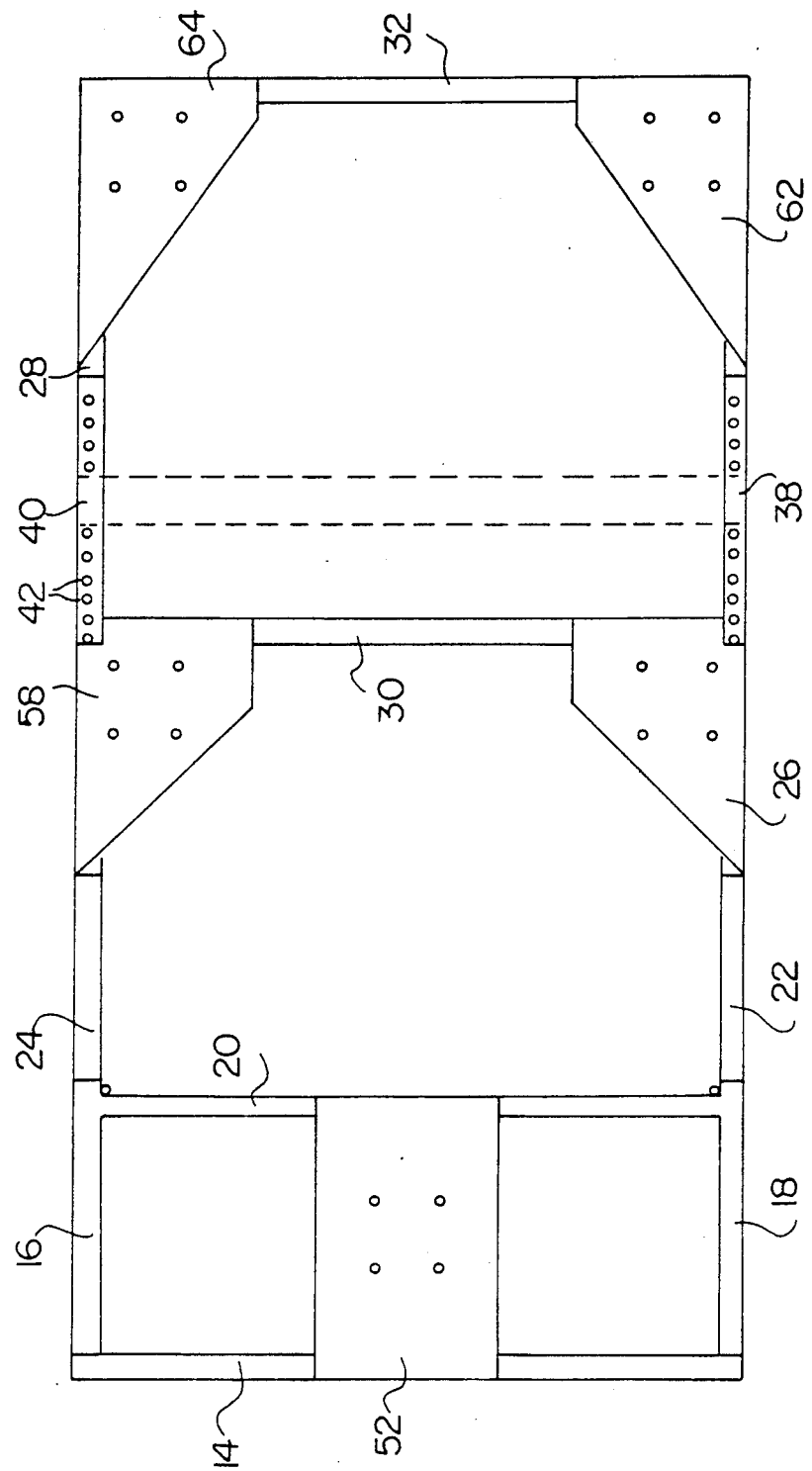
FIG. 4 is a plan view of the mobile platform.

Referring now to the drawings in detail, FIG. 1 is a perspective view of the snow plow mobile platform without the plow cradled on it. The mobile platform 10 is on wheels so that when the plow is on it the plow can be moved to the proper position to be attached to the vehicle, and when the plow is to be removed from the vehicle, the mobile platform can be wheeled to the correct position to receive it.

The mobile platform 10 has a frame made up of various members which are on two different levels, a lower level for the blade proper, and a higher level for the mounting equipment on the back of the blade to attach it to the vehicle. The frame has a front center cross piece 14 which is connected to a front left side piece 16 at one end and to a front right side piece 18 at the other end. A first center cross piece 20 is connected at one of its ends to the rearward portion of front left side piece 16 and at the other of its ends to the rearward end of front right side piece 18.

The next section of the frame is inclined and there is a right side center piece 22 connected to piece 18 and is inclined upwardly as it moves to the rear of the frame. There is also a left side center piece 24 connected to piece 16 and is inclined in a similar manner to piece 22. The rearward end of right side center piece 22 is connected to a right side beam 26 and the rearward end of left side center piece 24 is connected to a left side beam 28. A second center cross piece 30 is connected to the center of left and right side beams 26 and 28. The rearward ends of beams 26 and 28 are connected to a rear center cross piece 32. This is the entire frame of the mobile platform 10.

There is a snow plow push frame support mounted on this frame, and it will now be described. There are left and right angle supports 34 and 36 located above and the left side and right side beams, respectively, standing vertically, and which are attached to the right center caster mount 56 and left center caster mount 58. Right and left angle members 38 and 40 are connected with the upper ends of the left and right angle supports 34 and 36 at one end and the side beams 26 and 28 of the frame at the other ends to form a sloping push frame which cooperates with a bar or shim 44 to support this portion of the plow push frame.

Right and left angle members 38 and 40 have a series of openings 42 formed in them. There is a removable shim or bar 44 having dowels or pins 46 extending therefrom near each end of the shim bar 44 so that the pins 46 can be inserted into the appropriate openings 42 to be located at an appropriate height and position for the push frame of the snow plow.

There are also a group of wheel subassemblies which provide for movement of the mobile platform 10 and thus the snow plow. These will now be described. At the front and in the middle of the front center cross piece 14 are mounted two vertical risers 48. Two more vertical risers 50 are mounted in the middle of the first center cross piece 20. A front caster mount 52 includes a plate which is connected to the upper ends of risers 48 and 50. A caster assembly 54 is connected to the under surface of the plate 52.

There is a right center caster mount 56 mounted at the corner of the second center cross piece 30 and the right side beam 26, as well as another left center caster mount 58 is mounted at the corner of the second center cross piece 30 and the left side beam 28. A caster assembly 60 is connected to the underside of each center caster mount 56 and 58.

There is a right rear caster mount 62 mounted at the corner of the rear center cross piece 32 and the right side beam 26, as well as another left rear caster mount 64 mounted at the corner of the rear center cross piece 32 and the left side beam 28. A caster assembly 66 is connected to the underside of each rear caster mount 62 and 64.

The caster assemblies 54, 60 and 66 are all swivel mount casters, and the front one 54 has a wheel brake and/or lock while casters 60 and 66 do not have lock brakes. The caster assemblies each have a plate 72 at the top by which they are mounted to the various caster mounts. For example, the right rear caster mount 62 has a plate 68 in which there are openings which match the openings in the right rear caster mount 62, and bolts 74 are disposed through the matching openings and flat washers are placed onto the bolts and then a nut is attached to the end of each bolt 74 and tightened to fasten the caster assembly to the caster mount.

The above described embodiment is basically for use on hard surfaces. However, if the mounting and unmounting of the snow plow onto the vehicle must take place on soft surfaces such as the ground or pebbles, then the wheel assemblies are slightly different. In this case, pneumatic wheels or double casters take the place of the front and middle casters, and there are no wheels on the rear of the frame.

Figure 5:
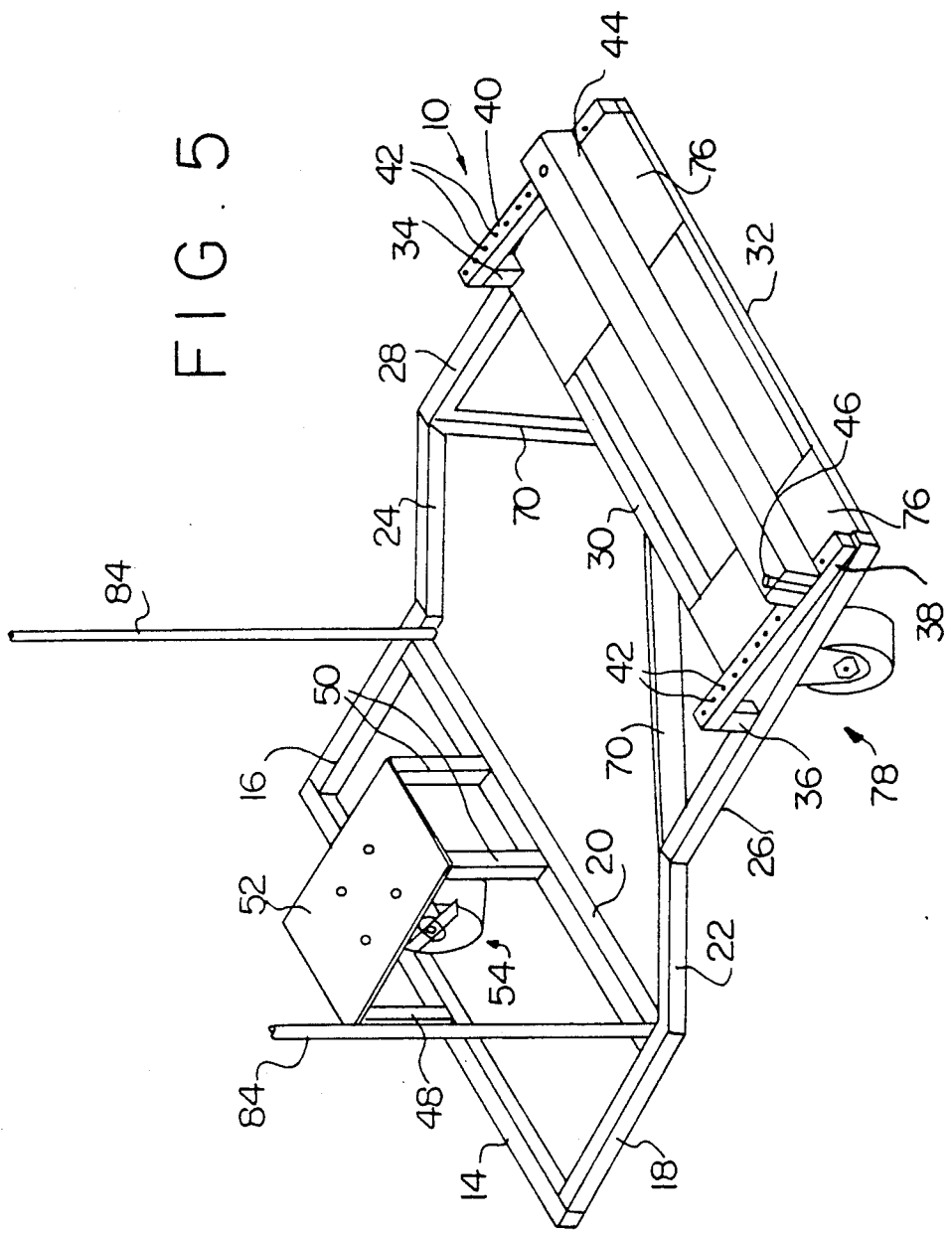
FIG. 5 is a perspective view of another embodiment of the snow plow mobile platform.
Figure 6:
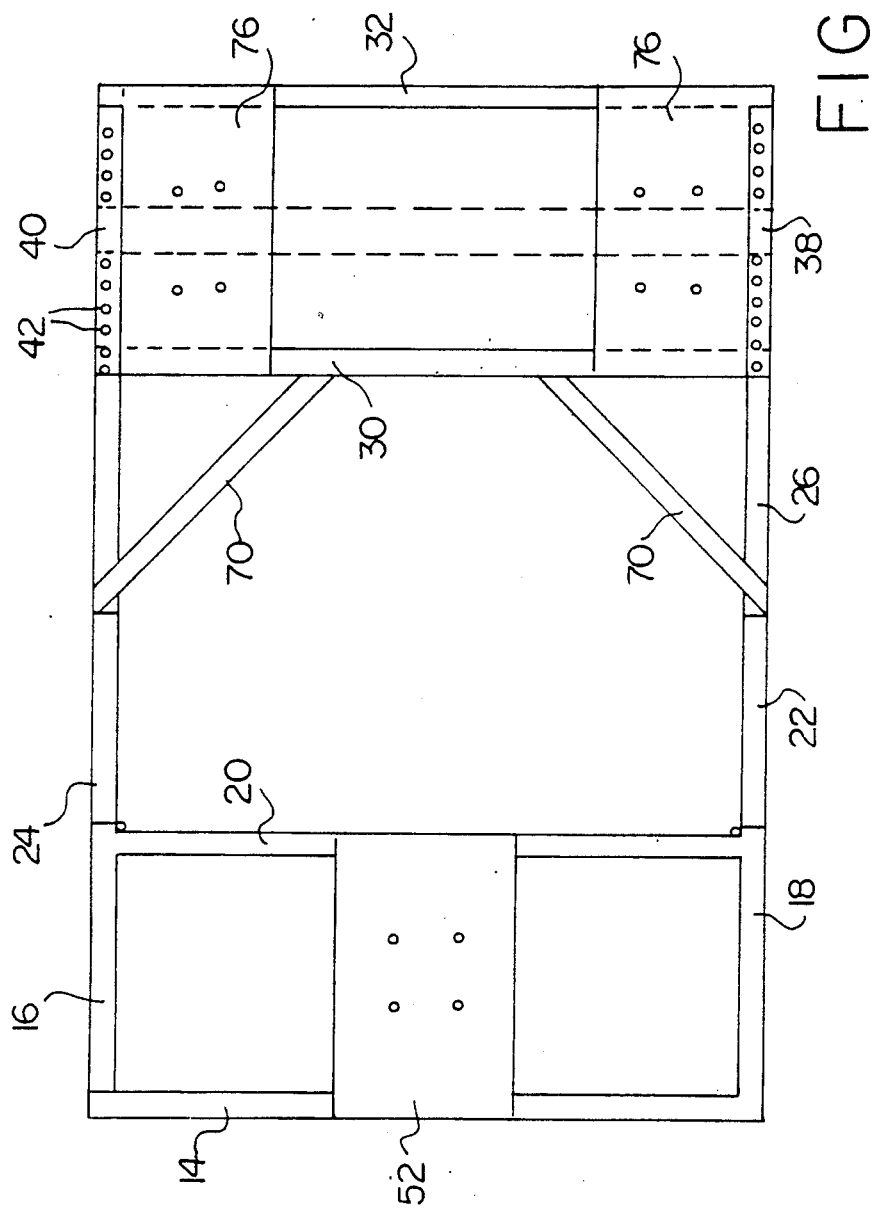
FIG. 6 is a plan view of the embodiment shown in FIG.5.

FIGS. 5 and 6 illustrate another embodiment of the invention in which the rearward portion of the frame is removed, as are the wheels which were mounted under it in the hard surface embodiment. The same reference numerals are used to designate the same parts, and new reference numerals are used to designate different parts.

This embodiment is shorter than the one previously described. It has angle supports 70 instead of the plates 62 and 64. There are plates 76 mounted at each rear corner, and onto which the rear wheels are mounted. In this arrangement the wheels 78 are swivel mounted. This embodiment is shorter than the first one and uses three wheels or casters rather than five. It also weighs less and is therefore easier to manually move.

INITIAL SETUP

In operation, it is assumed that the snow plow 80 is already on the vehicle 82. The vehicle is parked in the general location where it is desired to uncouple the plow. For safety the parking brake is set. If the plow is the power angle type, it is set in a straight position perpendicular to the vehicle 82. The plow 80 is placed into the raised position and the operator exits the vehicle 82, leaving the plow 80 in the raised position. The snow plow mobile platform 10 is rolled holding it by the vertical guides 84 under the plow so the rear adjustable support bar 44 is centered directly under the push frame 86 of the plow 80.

For safety, the operator should never reach under or place any body parts, i.e., feet, arms, legs, hands under any part of the plow or push frame while it is suspended in the up position. The operator then returns to the plow controls and lowers the plow 80 onto the mobile platform 10.

The operator returns to the plow 80 to check the setting for leveling the support bar 44. A mental note is made of the desired location hole where the support bar 44 will be placed. The proper placement of the support bar 44 will touch the underside of the push frame 86 in the uppermost portion of the bar. The use of the next higher or lower position of the support bar may work better. This will depend on the spring tension of the particular vehicle.

The operator returns to the plow control and raises the plow 80 again. Again the operator returns to the mobile platform 10 and rolls it out from under the plow and moves the leveling support bar 44 into the chosen holes. The mobile platform is repositioned under the plow 80 using the vertical guides 84.

The operator returns to the plow control and lowers the plow 80 onto the mobile platform 10. The locking push pins should now be able to be easily removed. If the pins do not slide out with ease repeat the prior steps increasing or decreasing the leveling support bar 44 to the next higher/lower position. Uncouple any hoses or chains as is usually done.

The plow 80 is now uncoupled and the vehicle may be backed away from the plow 80. The front wheel brake and/or lock are set to keep the unit secure.

In order to recouple the snow plow 80, the operator sets the parking brake on the vehicle 82. The vehicle 82 is positioned as normally done to attach the plow 80, stopping at least one foot from the unit. The plow frame is prepared on the vehicle as normally done to attach the plow, i.e., the push pins are released.

The operator stands at the front of the unit and releases the front wheel lock and/or brake. The unit is rolled into position. Pushing on the top front edge of the plow will yield the easiest method for rolling the unit. The push pins are pressed into the locked position. The hoses, chains, etc. are attached as normally done. The front wheel locks and;or brakes are relocked. The operator returns to the plow control and lifts the plow 80. The operator backs away to clear the mobile platform 10 and the vehicle 82 is ready to proceed with plowing snow.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

I claim:

1. A mobile platform for a snow plow, comprising:
   a. frame means shaped to hold the bottom of a curved snow plow blade;
   b. wheel means mounted on said frame means so that the mobile platform can be moved;
   c. support means on said frame means and positioned to support the push frame of a snow plow, the support means including inclined surfaces to which a support bar is removably attached for adjusting the height at which the plow push frame is disposed when the snow plow is on the mobile platform.

2. A mobile platform as defined in claim 1, wherein there are guide bars mounted on said frame to provide for the operator to locate the mobile platform with respect to the plow blade.

3. A mobile platform as defined in claim 2, wherein said wheel means includes a swivel action for at least the front of the mobile platform.

4. A mobile platform as defined in claim 3, wherein said wheel means for the front of the mobile platform has a lock and/or brake.

5. A mobile platform as defined in claim 4, wherein said wheel means includes a swivel action for the center and rear of the mobile platform.

6. A mobile platform as defined in claim 5, wherein there are five wheels on the platform.

7. A mobile platform as defined in claim 5, wherein there are three wheels on the platform.

8. A mobile platform for a snow plow, comprising:
   a. frame means shaped to hold the bottom of a curved snow plow blade and having a portion disposed at an angle which is relative to the incline at the bottom of snow plows in order to support the plow on the platform;
   b. wheel means mounted on said frame means so that the mobile platform can be moved and including a swivel wheel at the front of the frame;
   c. adjustable support means on said frame means and positioned to support the push frame of a snow plow and the height of which is adjustable, the support means including inclined surfaces to which a support bar is removably attached for adjusting the height at which the plow push frame is disposed when the snow plow is on the mobile platform.

9. A mobile platform as defined in claim 8, wherein said wheel means includes a swivel action for at least the front of the mobile platform.

10. A mobile platform as defined in claim 1, wherein said wheel means for the front of the mobile platform has a brake.

11. A mobile platform as defined in claim 10, wherein said wheel means includes a swivel action for the center and rear of the mobile platform.

12. A mobile platform as defined in claim 11, wherein there are five wheels on the platform.

13. A mobile platform as defined in claim 11, wherein there are three wheels on the platform.

* * * * *